(12) United States Patent
Hamabayashi et al.

(10) Patent No.: US 9,595,369 B2
(45) Date of Patent: Mar. 14, 2017

(54) WIRE HARNESS

(71) Applicant: YAZAKI CORPORATION, Tokyo (JP)

(72) Inventors: Teruki Hamabayashi, Makinohara (JP); Nobuaki Date, Makinohara (JP); Takaaki Yanagihashi, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 14/817,369

(22) Filed: Aug. 4, 2015

(65) Prior Publication Data

US 2016/0055938 A1 Feb. 25, 2016

(30) Foreign Application Priority Data

Aug. 19, 2014 (JP) ................... 2014-166787

(51) Int. Cl.
*H01B 7/00* (2006.01)
*H01B 11/06* (2006.01)
*H01B 13/012* (2006.01)
*H02G 3/04* (2006.01)

(52) U.S. Cl.
CPC ..... *H01B 7/0045* (2013.01); *H01B 13/01263* (2013.01); *H02G 3/0481* (2013.01)

(58) Field of Classification Search
CPC ............ H01B 13/01263; H01B 7/0045; H02G 3/0481
USPC ........................................ 174/36, 72 A, 72 R
See application file for complete search history.

(56) References Cited

U.S. PATENT DOCUMENTS

| | | | | |
|---|---|---|---|---|
| 5,367,126 A | * | 11/1994 | Kikuchi | ............... H01B 7/0045 174/135 |
| 6,674,004 B2 | * | 1/2004 | Ito | ....................... B60R 16/0215 174/135 |
| 2012/0261184 A1 | * | 10/2012 | Kitamura | ............ B60R 16/0215 174/72 A |
| 2013/0098660 A1 | * | 4/2013 | Igarashi | ............... H02G 3/0481 174/135 |
| 2013/0333943 A1 | * | 12/2013 | Tanaka | ................... H01R 9/038 174/72 R |
| 2014/0144698 A1 | * | 5/2014 | Sato | ..................... H02G 3/0481 174/72 A |

FOREIGN PATENT DOCUMENTS

JP     3-3116 U    1/1991

* cited by examiner

*Primary Examiner* — Sherman Ng
(74) *Attorney, Agent, or Firm* — Sughrue Mion, PLLC

(57) ABSTRACT

A wire harness includes a main line, a branch line which is branched from an intermediate part of the main line, a self-adhesive sheet which holds and covers the main line and the branch line and is folded so that one pair of edge parts thereof extending along the main line are stuck to each other in a state the branch line is drawn out from the one pair of edge parts, and a temporarily fixing member which bundles the main line at a position outside of the intermediate part in an extending direction of the main line.

3 Claims, 3 Drawing Sheets

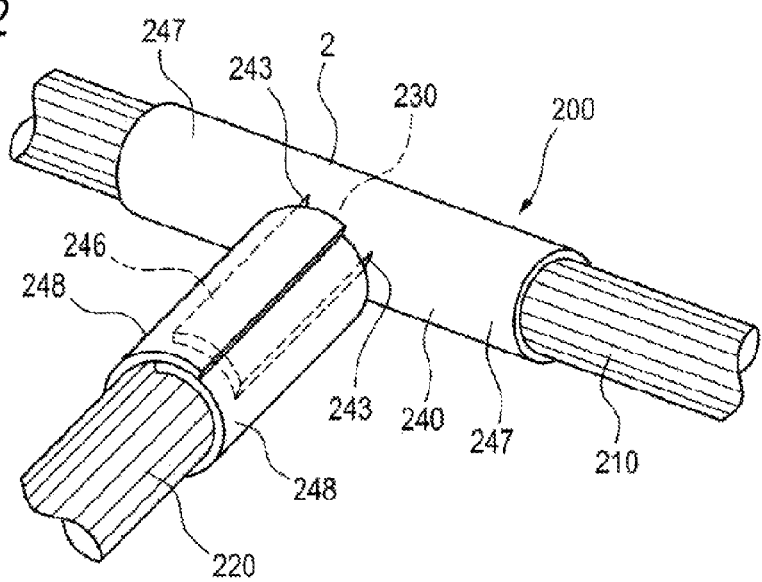
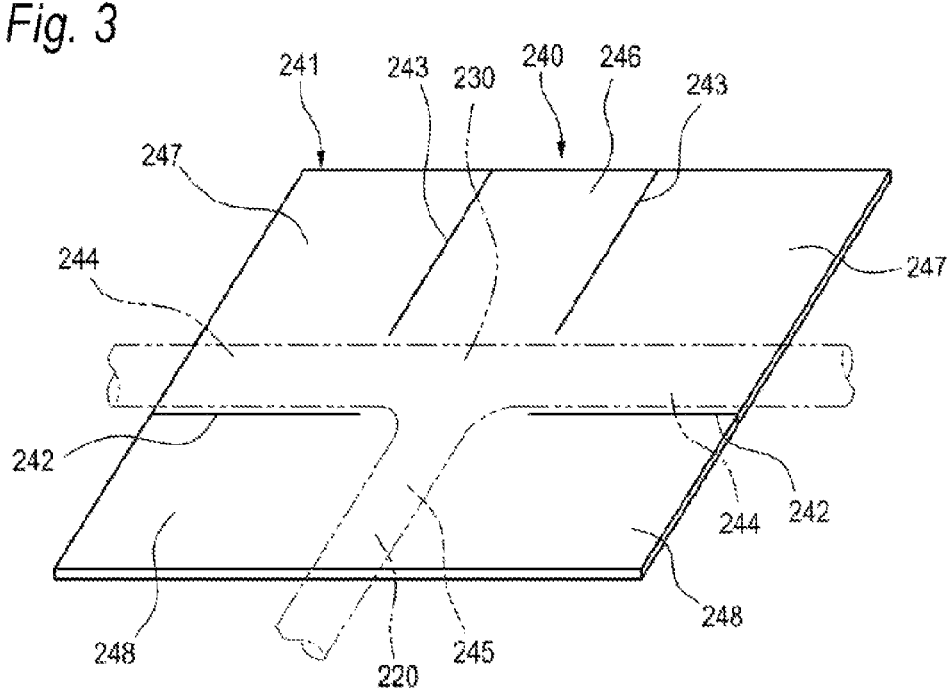

WIRE HARNESS

BACKGROUND

The present invention relates to a wire harness.

A wire harness 200 shown in FIG. 2 and FIG. 3 is a wire harness disclosed in below-described patent literature 1.

The wire harness 200 includes a main line 210, a branch line 220 branching from the main line 210 and one adhesive tape 240 with which a branch part 230 is covered.

The adhesive tape 240 is a tape one side of which is an adhesive surface. As shown in FIG. 3, the adhesive tape 240 has one base material tape 241 of a substantially rectangular shape which includes one pair of splits 242 formed along one side of the main line 210 mounted on the base material tape 241 from which the branch line 220 branches and one pair of splits 243 formed along an extending direction of the branch line 220 in an area opposite to the branch side of the main line 210 mounted on the base material tape 241.

Then, by the above-described four splits, the adhesive tape 240 forms, a belt shaped main line mounting part 244 on which the main line 210 is mounted, a branch line mounting part 245 on which the branch line 220 is mounted, a branch line holding part 246 folded on the branch line 220 mounted on the branch line mounting part 245, main line winding parts 247 wound on the main line 210 mounted on the main line mounting part 244 and branch line winding parts 248 wound on the branch line 220 from above the branch line holding part 246 folded on the branch line 220.

In the case of the wire harness 200 disclosed in the patent literature 1, since an entire part of the branch part 230 is covered with the adhesive tape 240, in both a bundle of electric wires located in both sides of the branch part 230 of the main line 210 and a bundle of electric wires of the branch line 220 extending from the branch part 230, the electric wires which form the bundles can be prevented from being unfixed, so that a deterioration of a wiring property caused by the electric wires which are unfixed can be prevented.

However, in the wire harness 200 disclosed in the patent literature 1, the adhesive tape 240 used in the branch part 230 is large and has many splits 242 and 243. Accordingly, there is a fear that during an operation for sticking the adhesive tape 240 to the branch part 230, a form shown in FIG. 3 may possibly collapse due to wrinkles, or a part of the adhesive tape may be possibly folded on other part and cannot be peeled, so that the adhesive tape cannot be stuck to the branch part 230. Further, the adhesive tape 240 is sometimes hardly separated from a hand and fingers, so that it is troublesome to separate the adhesive tape from the hand and fingers.

Accordingly, when the adhesive tape 240 is stuck to the branch part 230, a cautious and careful operation is necessary, so that it is difficult to improve productivity.

Thus, as shown in FIG. 4, a simple structure that bundles of the main line 210 at both sides of the branch part 230 are merely united together by belt shaped adhesive tapes 260 is supposed to be formed so as to improve productivity. In this structure, inside edges 261 of the adhesive tapes 260 which respectively untie together the main line 210 are allowed to come close to the branch part 230, so that a plurality of electric wires which form the branch line 220 can be bundled.

[Patent Literature 1] Japanese Utility Model Publication No. H03-3116

SUMMARY

In the structure shown in FIG. 4, there is a fear that when positions where the adhesive tapes 260 are attached are not determined by a jig or the like, the attached positions of the adhesive tapes 260 may possibly shift to cause unevenness in quality.

When positions of the inside edges 261 of the adhesive tapes 260 are separated from the branch part 230, even if the electric wires of the branch line 220 are initially bundled, the electric wires forming the branch line 220 may be respectively unfixed by an external force applied to the branch line 220 as shown in FIG. 5. Thus, a diameter of the bundle may be increased or the unfixed electric wires may be liable to be caught in peripheral instruments so that a wiring property of the wire harness 200 may be probably deteriorated.

Thus, it is an object of the present invention to solve the above-described problems and provide a wire harness having a stable quality which has a simple structure and can prevent a bundle of a branch line branching from a main line from being unfixed and maintain a diameter of the bundle of the branch line within a prescribed range.

The above-describe object of the present invention is achieved by a below-described structure.

(1) A wire harness comprising:
a main line;
a branch line which is branched from an intermediate part of the main line;
a self-adhesive sheet which holds and covers the main line and the branch line and is folded so that one pair of edge parts thereof extending along the main line stuck to each other in a state the branch line is drawn out from the one pair of edge parts; and
a temporarily fixing member which bundle the main line at a position outside of the intermediate part in an extending direction of the main line.

(2) The wire harness according to the above described (1), wherein the temporarily fixing member is an adhesive tape.

BRIEF DESCRIPTION OF THE DRAWINGS

FIG. 2 is a perspective view of a usual wire harness.

FIG. 3 is a development view of an adhesive tape which covers a branch part of the wire harness shown in FIG. 2.

DETAILED DESCRIPTION OF EXEMPLIFIED EMBODIMENTS

Figure 1:
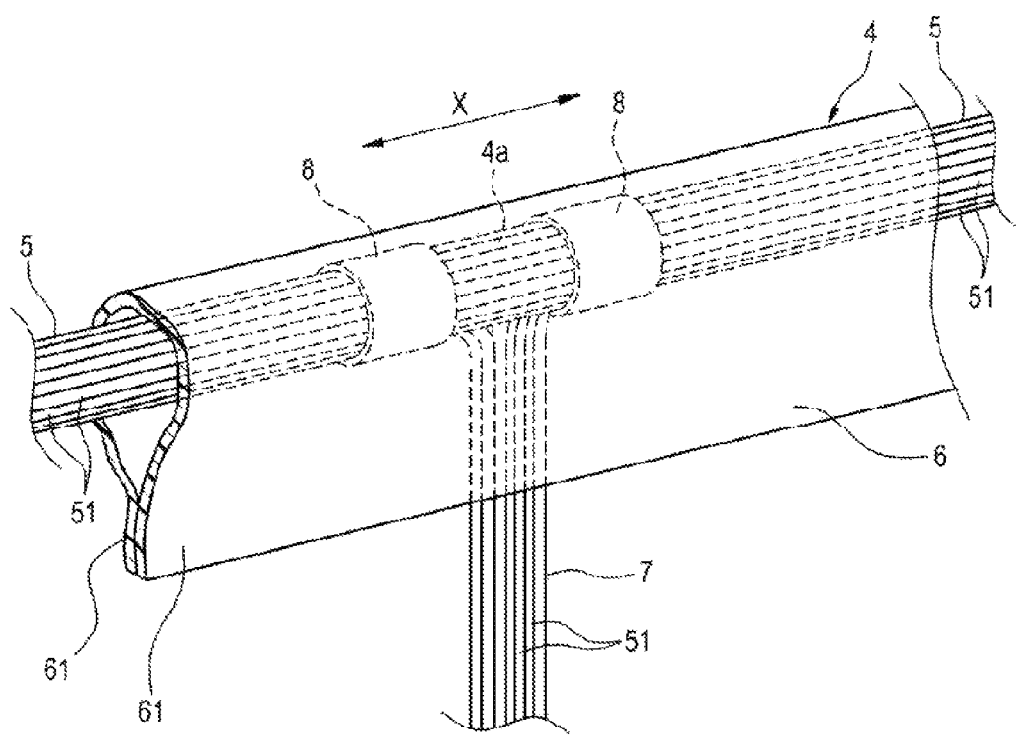
FIG. 1 is a perspective view of one exemplary embodiment of a wire harness according to the present invention.
Figure 4:
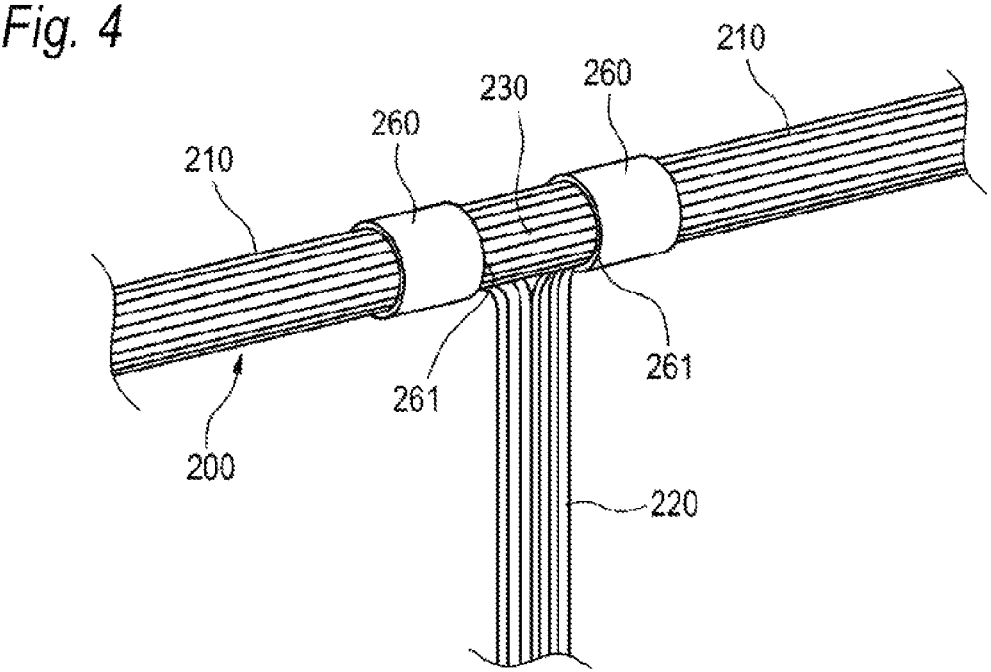
FIG. 4 is a perspective view of the usual wire harness in which a binding structure by an adhesive tape is simplified.
Figure 5:
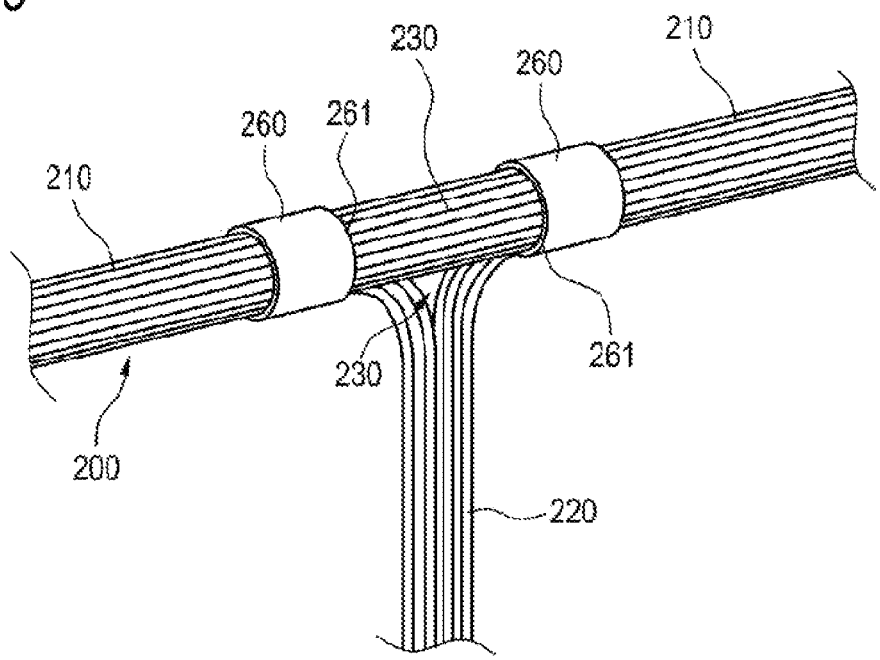
FIG. 5 is an explanatory view of an inconvenience arising in the wire harness shown in FIG. 4.

Now, a preferred exemplary embodiment of a wire harness according to the present invention will be described below in detail by referring to the drawings.

FIG. 1 is a perspective view of one exemplary embodiment of the wire harness according to the present invention.

The wire harness 4 of the one exemplary embodiment includes a main line 5, a one side self-adhesive sheet 6, a branch line 7 and temporarily fixing members 8.

The main line 5 is a bundle of electric wires formed with a plurality of coated electric wires 51. In an intermediate part of the main line 5, a branch part 4a is set from which the branch line 7 branches.

The one side self-adhesive sheet 6 is a rectangular sheet which holds and covers the main line 5 and the branch line 7 in the branch part 4a. Further, the one side self-adhesive sheet 6 has one pair of edge parts 61 and 61 along the main line 5 which are superposed one upon another and stuck to each other.

In the one side self-adhesive sheet 6, surfaces (one sides) which are superposed one upon another are self-adhesive surfaces. Only when the self-adhesive surfaces are superposed one upon another, the one side self-adhesive sheet 6 achieves an adhesive property to stick the superposed surfaces to each other. The self-adhesive surface of the one side self-adhesive sheet 6 does not exhibit the adhesive property for other parts than the self-adhesive surface and does not stick to fingers of an operator or the main line 5 or the branch line 7 which comes into contact with the self-adhesive surface.

In the one side self-adhesive sheet 6 used in the present exemplary embodiment, the self-adhesive surfaces (back surfaces) of itself can be stuck to each other by a self-adhesion. Namely, the one side self-adhesive sheet 6 requires no paste or no binding tape and can be simply stuck only by superposing the adhesive surfaces (the back surfaces) one upon another. The one side self-adhesive sheet 6 is formed in such a way that a surface material is laminated on a surface of a sheet base material made of a PP (polypropylene) foaming material and a special adhesive agent layer is laminated on a back surface. As the surface material, kraft paper, a liner board, a PET (polyethylene terephthalate) film, a PP film, a non-woven fabric or the like can be used. The one side self-adhesive sheet 6 has below-described properties respectively. Namely, a tensile strength shows 49 N/cm width in a direction of length and 23 N/cm width in a direction of breadth (based on JIS K-6767). A tearing resistance shows 7.8 N in a direction of length and 6.8 N in a direction of breadth (based on JIS K-6767). A transmittance of steam shows 0.0052 g/cm 2.24 hrs (FS-101B). An initial adhesion shows 2.5 N/cm width (a T type friction test). As the one side self-adhesive sheet, for instance, Cro-nel (a registered trademark) produced by US Crowell Company can be used.

The branch line 7 is a bundle of electric wires formed with a plurality of coated electric wires 51 which branch from the intermediate part of the main line 5. The branch line 7 is held together with the main line 5 by the one side self-adhesive sheet 6 and covered with the one side self-adhesive sheet 6 in the branch part 4a. Further, the branch line 7 is drawn out from the one pair of edge parts 61 and 61 which are stuck to each other.

In the present exemplary embodiment, the temporarily fixing member 8 is an adhesive tape having an adhesive layer provided on one side. The temporarily fixing members 8 bundle the main line 5 outside an extending direction (a direction shown by an arrow mark X in FIG. 1) of the main line 5 from the branch part 4a of the branch line 7 in the main line 5.

In the wire harness 4 described above, since the main lines 5 in both the sides of the branch part 4a are bundled by the temporarily fixing members 8, the branch line 7 extending from the branch part 4 can be put together substantially in the form of a bundle. Then, after the main lines 5 at both the sides of the branch part 4a are bundled by the temporarily fixing members 8, the main line 5 and the branch line 7 in the branch part 4a are held and covered with the one side self-adhesive sheet 6.

In the self-adhesive sheet 6, when the adhesive surfaces of the one side self-adhesive sheet are superposed one upon another, the superposed surfaces are stuck to each other by a prescribed adhesive strength. Thus, when members which come into contact with the adhesive surfaces of the one side self-adhesive sheet 6 are other parts than the adhesive surfaces of the one side self-adhesive sheet such as the wire harness 4 or the hand or fingers of the operator, the self-adhesive sheet 6 does not exhibit an adhesive property.

Accordingly, when the one side self-adhesive sheet 6 is attached to the branch part 4a, the one side self-adhesive sheet 6 is not unexpectedly stuck to other parts, so that it is not difficult to carry out an operation. Thus, the one side self-adhesive sheet 6 can be simply attached to the branch part 4a so as to hold and cover the main line 5 or the branch line 7 in the branch part 4a.

Then, when the one side self-adhesive sheet 6 which covers the branch part 4a presses inward the one side self-adhesive sheets 6 which are superposed one upon another, for instance, from a periphery to stick them to each other, a periphery of the main line 5 and a periphery of the branch line 7 are surrounded by adhesive areas of one side self-adhesive sheets 6. Thus, a movement of the electric wires forming the main line 5 or the branch line 7 is regulated, so that the electric wires are respectively prevented from being unfixed.

Accordingly, even if the bundled parts by the temporarily fixing members 8 are distant from the branch part 4a, when the branch part 4a is held by the one side self-adhesive sheet 6 and the one side self-adhesive sheets 6 superposed one upon another in the peripheries of the main line 5 and the branch line 7 are stuck to each other while the electric wires forming the branch line 7 are put together substantially in the shape of a bundle immediately after a binding operation by the temporarily fixing members 8, the movements of the electric wires forming the main line 5 or the branch line 7 are respectively regulated. Accordingly, the electric wires forming the branch line 7 can be prevented from being unfixed by an external force applied to the branch line 7. Thus, an inconvenience can be prevented that a diameter of the bundle of the branch line 7 is gradually increased due to the electric wires which are unfixed.

Accordingly, the bundle of the branch line 7 which branches from the main line 5 can be prevented form being unfixed. Further, even when the attached positions of the temporarily fixing members 7 are not precisely regulated, the wire harness 4 can be provided which maintains the diameter of the bundle of the branch line 7 within a prescribed range and has a stable quality.

Further, in the wire harness 4 of the one exemplary embodiment, since the temporarily fixing member 8 is the adhesive tape which is distributed at a relatively low cost, the temporarily fixing members are merely wound on the periphery of the main line 5 in a stretched state, so that the main line 5 can be simply bound. Thus, the cost of the wire harness 4 can be reduced and productivity of the wire harness 4 can be improved.

The present invention is not limited to the above-described exemplary embodiment, and may be suitably modified and improved. In addition thereto, the qualities, forms, dimensions, numbers, arranged positions or the like of the component elements in the above-described exemplary embodiment are arbitrary and are not limited as long as they can realize the present invention.

For instance, the temporarily fixing member is not limited to the adhesive tape. A binding band may be used which includes a band part provided with a plurality of engaging irregularities in one side and a band engaging part in one end of the band part through which the band part can be inserted to be engaged with the engaging irregularities of the inserted band part. Further, the temporarily fixing member may be a C shaped ring type member, a string or an adhesive agent.

Further, the self-adhesive sheet may be a double side self-adhesive sheet which has a self-adhesive property in both surfaces.

Here, features of the exemplary embodiment of the wire harness according to the present invention are respectively briefly summarized and enumerated.

A wire harness (4) including:
a main line (5);
a branch line (7) which is branched form an intermediate part of the main line (5);
a self-adhesive sheet (6) which holds and covers the main line (5) and the branch line (7) and is folded so that one pair of edge parts thereof extending along the main line (5) are stuck to each other in a state the branch line (7) is drawn out from the one pair of edge parts; and
a temporarily fixing member (8) which bundles the main line (5) at a position outside of the intermediate part in an extending direction of the main line (5).

The wire harness (4) according to the above-described, wherein the temporarily fixing member (8) is an adhesive tape.

According to the structure of the above-described, since the main lines in both the sides of the branch part are bundled by the temporarily fixing members, the branch line extending from the branch part can be put together substantially in the form of a bundle. Then, after the main lines at both the sides of the branch part are bundled by the temporarily fixing members, the main line and the branch line in the branch part are held and covered with the self-adhesive sheet.

In the self-adhesive sheet, when adhesive surfaces of the self-adhesive sheet are superposed one upon another, the superposed surfaces are stuck to each other by a prescribed adhesive strength. Thus, when members which come into contact with the adhesive surfaces of the self-adhesive sheet are other parts than the adhesive surfaces of the self-adhesive sheet such as the wire harness or a hand and fingers, the self-adhesive sheet does not exhibit an adhesive property. Accordingly, when the self-adhesive sheet is attached to the branch part, the self-adhesive sheet is not unexpectedly stuck to other parts, so that it is not difficult to carry out an operation. Thus, the self-adhesive sheet can be simply attached to the branch part so as to hold and cover the main line or the branch line in the branch part.

Then, when the self-adhesive sheet which covers the branch part presses inward the self-adhesive sheets which are superposed one upon another, for instance, from a periphery to stick them together, a periphery of the main line and a periphery of the branch line are surrounded by adhesive areas of the self-adhesive sheets. Thus, a movement of electric wires forming the main line or the branch line is regulated, so that the electric wires are respectively prevented from being unfixed.

Accordingly, even if the bundled parts by the temporarily fixing members are distant from the branch part, when the branch part is held by the self-adhesive sheet and the self-adhesive sheets superposed one upon another in the peripheries of the main line and the branch line are stuck to each other while the electric wires forming the branch line are put together substantially in the shape of a bundle immediately after a binding operation by the temporarily fixing members, the movements of the electric wires forming the main line or the branch line are respectively regulated. Accordingly, the electric wires forming the branch line can be prevented from being unfixed by an external force applied to the branch line. Thus, an inconvenience can be prevented that a diameter of the bundle of the branch line is gradually increased due to the electric wires which are unfixed.

Accordingly, the bundle of the branch line which branches from the main line can be prevented from being unfixed. Further, even when the attached positions of the temporarily fixing members are not precisely regulated, the wire harness can be provided which maintains the diameter of the bundle of the branch line within a prescribed range and has a stable quality.

According to the structure of the above-described, since the temporarily fixing member is the adhesive tape which is distributed at a relatively low cost, the temporarily fixing members are merely wound on the periphery of the main line in a stretched state, so that the main line can be simply bound. Thus, the cost can be reduced and productivity can be improved.

According to the present invention, the wire harness can be provided which has a stable quality and can prevent a bundle of a branch line branching from a main line from being unfixed and maintain a diameter of the bundle of the branch line within a prescribed range with a simple structure.

The present invention is based on Japanese Patent Application (No. JP-2014-166787) filed on Aug. 19, 2014, the entire subject matter of which is incorporated herein by way of reference.

What is claimed is:

1. A wire harness comprising:
a main line;
a branch line which is branched from an intermediate part of the main line;
a temporarily fixing member which bundles the main line at a position outside of the intermediate part in an extending direction of the main line; and
a self-adhesive sheet which holds and covers the main line, the temporarily fixing member and the branch line, and is folded so that one pair of edge parts thereof extending along the main line are stuck to each other in a state the branch line is drawn out from the one pair of edge parts,
wherein the self-adhesive sheet has self-adhesive surfaces that are superposed and stuck to each other but are not stuck to the main line and the branch line.

2. The wire harness according to the claim 1, wherein the temporarily fixing member is an adhesive tape.

3. The wire harness according to the claim 1, wherein the temporarily fixing member is provided on each side of the intermediate part from which the branch line is branched.

* * * * *